May 7, 1935.  A. W. KRIEGER  2,000,451
COMBINATION AQUARIUM
Filed Nov. 4, 1932
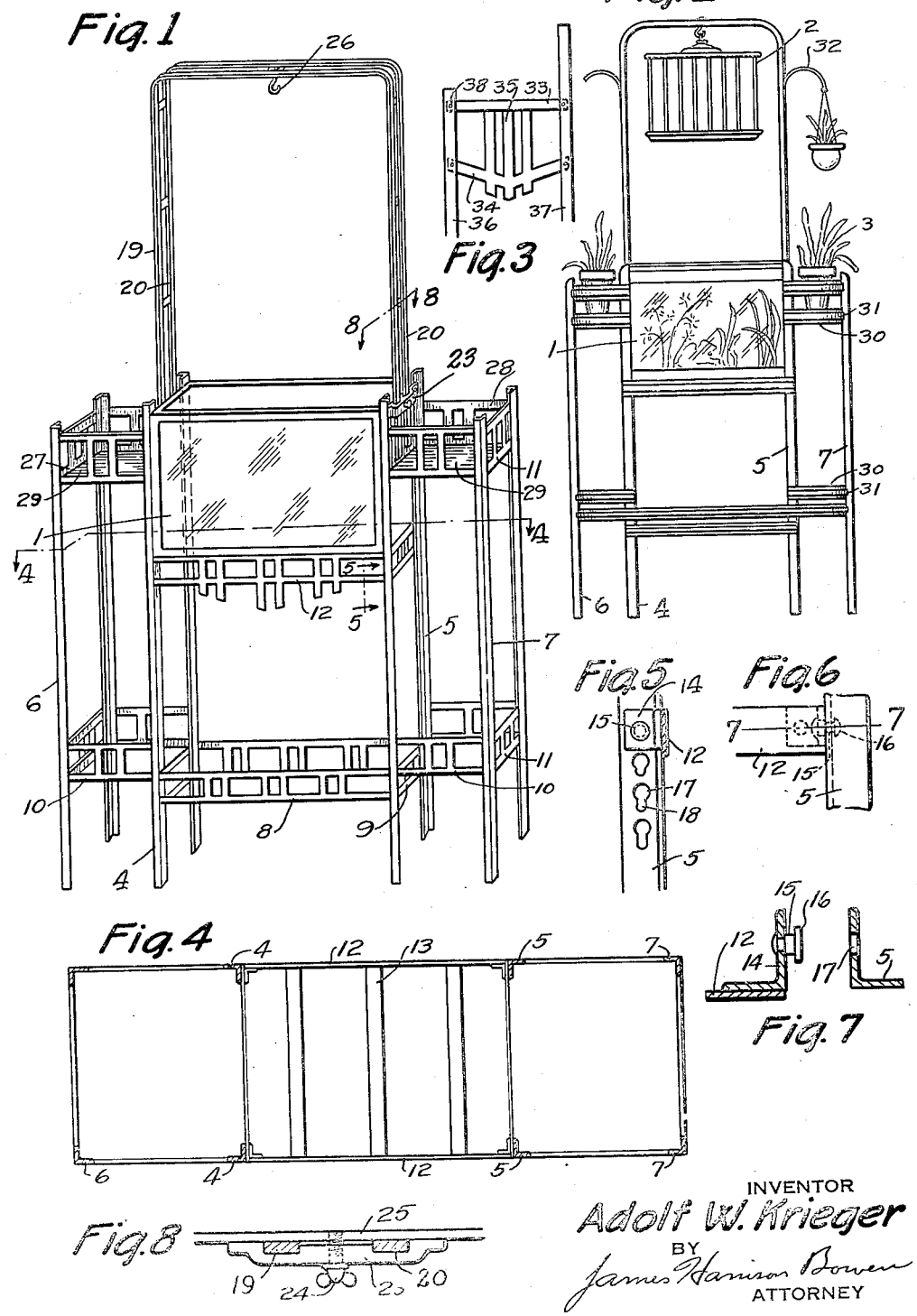
INVENTOR
Adolf W. Krieger
BY
James Harrison Bowen
ATTORNEY Patented May 7, 1935

2,000,451

UNITED STATES PATENT OFFICE 2,000,451

COMBINATION AQUARIUM

Adolf W. Krieger, Brooklyn, N. Y.

Application November 4, 1932, Serial No. 641,208

1 Claim. (Cl. 119—5)

The invention is a combination aquarium stand in which the heighth of the aquarium may readily be adjusted to compensate for different heighths of window sills in which the stand is provided with an adjustable handle that may also be used to support a bird cage and also in which space is provided at the sides of the stand for holding plants or the like.

The object of the invention is to provide a combination aquarium stand in which the heighth of the aquarium may readily be adjusted to compensate for the differences in heighth of window sills to provide light thru the aquarium when the aquarium is used in combination with other objects such as plants and a bird cage.

Another object of the invention is to provide an aquarium stand which combines the aquarium with plants and a bird cage in which the different parts are adjustable in relation to each other.

Another object of the invention is to provide a stand in which an aquarium may be combined with plants, a bird cage, or the like, in order to produce an artistic effect and also economize space.

And a still further object of the invention is to provide a combination aquarium stand which is of a simple and economical construction.

With these ends in view the invention embodies a stand having a central part in which an aquarium is adjustably mounted, two end sections in the upper ends of which plants may be held, and an adjustable handle.

Other features and advantages of the invention will appear from the following description taken in connection with the drawing, wherein:

Figure 1 is a view showing one arrangement of the aquarium stand.

Figure 2 is a view showing a stand of a different design.

Figure 3 is a detail showing an end view of the stand in which the rear portion of the stand extends upward above the front portion.

Figure 4 is a sectional view taken on the plane defined by the line 4—4 on Fig. 1, the aquarium being omitted.

Figure 5 is a sectional view taken on the plane defined by the line 5—5 on Fig. 1.

Figure 6 is a detail looking toward the front of the section shown in Figure 5.

Figure 7 is a sectional view taken on the plane defined by the line 7—7 on Fig. 6.

Fig. 8 is a sectional view taken on a plane defined by the line 8—8 on Fig. 1.

In the drawing the device is shown as it would be made wherein numeral 1 indicates an aquarium, numeral 2 a bird cage, and numeral 3 plants that may be used in combination with the aquarium.

In the design shown the stand for the aquarium is formed with intermediate posts 4 and 5 and end posts 6 and 7. The intermediate posts may be held together by cross members 8 and 9 and the end posts are held to the intermediate posts by cross members 10, and connected to each other by cross members 11. The posts 4, 5, 6 and 7 may be angular shaped, as shown in Figures 1 and 4, or may be made of square tubing, as shown in Figure 2, or of material of any other type or description. The posts may also be held together by cross members of any other type or description and the cross members may be straight, or of any shape or design and provided at any point or points. In the design shown cross members 12 are provided between the posts 4 and 5 and these may be connected by bars 13, as shown in Figure 4. The members 12 are provided with clip angles 14 at their ends and pins 15 may be provided in the clips 14, as shown in Figure 7. The pins 15 are provided with heads 16 which may be inserted thru openings 17 in the inner sides of the posts 4 and 5 and the openings 17 are provided with notches 18 in their lower sides into which the pins 15 may drop. It will be noted that the pins may be changed from one opening to another in order to change the heighth of the members 12 and thereby adjust the heighth of the aquarium. It will be understood that the aquarium may be used in front of a window and it is desired to have the top of the aquarium slightly above the window sill so that light from the window will pass thru the aquarium and, as window sills are of different heighths, it is desirable to readily adjust the elevation of the aquarium to compensate for the different elevations of the window sills. It will be understood that the members 12 and the cross members 13 may be of any design and may be arranged in any manner to accommodate aquariums of different sizes and shapes. It will also be understood that other means may be used for adjusting the heighth of the aquarium.

A bird cage may be supported above the aquarium by a handle which may be formed of bars 19 and 20 which extend upward, as shown in Figure 1. These bars may be slidably held in sockets 21 and 22 in a clamp 23 by a bolt 24 which may be threaded into a cross bar 25 so that as it is screwed inward it will clamp the bars 19 and 20 against the cross bar and rigidly hold them in any position. It will, therefore, be noted that the handle may be raised and lowered and when it is desired to carry the stand the handle may be lowered so that it may be used as a handle, and when the stand is in position the handle may be raised so that a bird cage 2 may be suspended therein from a hook 26. It will be understood that the handle may be of any other shape or design, may be formed of any number of pieces of material, and may be adjustably mounted upon the aquarium stand in any manner.

At the sides of the aquarium are open compartments 27 and 28 in which plants 3 may be placed and the lower ends of these compartments may be provided with plates 29 which may readily be removed and replaced. These plates may, therefore, readily be cleaned.

In the design shown in Figure 2 the stand is formed of square tubular posts with the corners rounded. In this design the cross bars are formed with a copper or brass bar 30 and a white or aluminum bar 31 may be placed on top of the bars 30 to produce bars of different colors and it will be understood that these bars may be made of any material and any number of different colors may be used. In this design the aquarium and handle are also adjustable and the parts may be attached in any manner. It will also be understood that the stand may be made of any other design and the parts arranged in any manner.

In Figure 3 an alternate design is shown in which the end member is formed by an upper bar 33, a sloping bar 34, and vertical pieces 35. The bars 33 and 34 may be attached to posts 36 and 37 by rivets 38, as shown, or in any other manner. It will be understood that these members may be used in place of the members 11 or at any other point or points on the stand. It will also be understood that these cross members may be of any other design or description.

It will be understood that other changes may be made in the construction without departing from the spirit of the invention. One of which changes may be in the use of any number of compartments for holding flowers in combination with a stand, another may be in the use of brackets 32 on the handle for supporting plants or the like, as shown in Figure 2, another may be in the relative positions of the different parts as it will be understood that the aquarium or plants may be higher or lower as may be desired, and still another may be in the use of any other means for providing ornaments on the stand. Plates 29 may also be placed in the cross members at the lower part of the frame so that flowers or the like may be held therein.

The construction will be readily understood from the following description. The stand may be provided in any number of designs and with the aquarium, plants and bird cage arranged in many different positions in relation to each other, the stand may also be made of structural shapes of any design or description or of any material and the material may be designed, arranged, and the pieces attached in any manner desired. In either design the stand is of such a heighth that the aquarium will be slightly above the window sill so that light will shine therethru and as window sills are of different heighths the heighth of the aquarium may be adjusted to correspond with any window sill. The heighth of the bird cage in relation to the aquarium may also be readily adjusted so that one may be artistically arranged in relation to the other to produce any desired effect. Brackets 32 may be provided on the stand shown in Figure 1 or on a stand of any design and as many brackets as may be desired may be used. It will also be understood that any other means may be used in combination with the stand for supporting plants or the like.

Having thus fully described the invention what I claim as new and desire to secure by Letters Patent, is:

The combination with an aquarium stand of the type having adjoining plant stands; of an adjustable aquarium supporting platform in said aquarium stand and an adjustable inverted U shaped bracket extending upward above said aquarium stand and adjustably mounted thereon in which the bracket may be lowered to form a handle and raised to support a plant, bird cage or the like.

ADOLF W. KRIEGER.